United States Patent [19]
Hoffmann

[11] 4,250,916
[45] Feb. 17, 1981

[54] CHECK VALVE WITH DAMPING DEVICE

[75] Inventor: Jürgen Hoffmann, Erlangen, Fed. Rep. of Germany

[73] Assignee: Kraftwerk Union Aktiengesellschaft, Mulheim an der Ruhr, Fed. Rep. of Germany

[21] Appl. No.: 930,563

[22] Filed: Aug. 3, 1978

[30] Foreign Application Priority Data

Aug. 10, 1977 [DE] Fed. Rep. of Germany ....... 2736076

[51] Int. Cl.³ ............................................. F16K 15/06
[52] U.S. Cl. ................................................. 137/514.5
[58] Field of Search .................. 137/514, 514.3, 514.5, 137/514.7

[56] References Cited

U.S. PATENT DOCUMENTS

| 1,684,987 | 9/1928 | Hazard | 137/514.7 |
| 1,754,975 | 4/1930 | Anderson | 137/514.5 |
| 2,318,963 | 5/1943 | Parker | 137/514.7 |
| 2,583,295 | 1/1952 | Greer et al. | 137/514.7 X |

FOREIGN PATENT DOCUMENTS

6391 of 1906 United Kingdom ................. 137/514.5

*Primary Examiner*—William R. Cline
*Attorney, Agent, or Firm*—Herbert L. Lerner

[57] ABSTRACT

A check valve assembly has a damping device for liquid lines and includes a hollow cylindrical chamber, a valve seat, an axially movably supported closure member being movable between an open position of the check valve and a closed position of the check valve in which the closure member lies on the valve seat, a hollow cylindrical guide member having a shell defining an inner space, and a damping piston having two sides and being disposed on the outer periphery of the guide member. The damping piston is firmly connected to the closure member and axially movably guidable in the hollow cylindrical chamber. The shell has throttle openings formed therein at both of the sides of the damping piston for connecting the hollow cylindrical chamber with the inner space. Part of the throttle openings are in communication with the hollow cylindrical chamber in the vicinity of the open and closed positions of the check valve.

1 Claim, 1 Drawing Figure

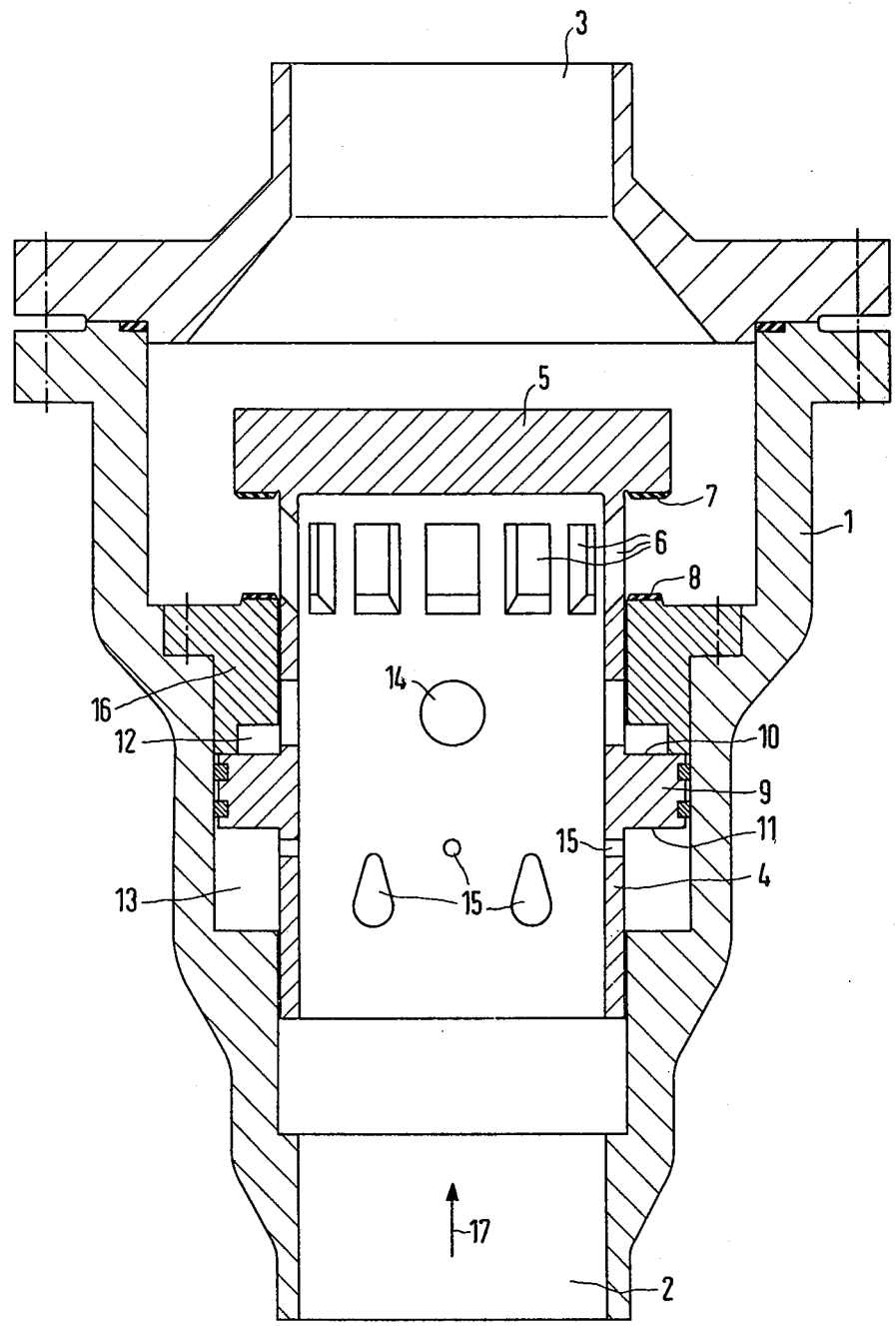

CHECK VALVE WITH DAMPING DEVICE

BACKGROUND OF THE INVENTION

1. Field of the Invention

The invention relates to a check valve with damping device for liquid lines having a closure member mounted for axial displacement and, in closed condition of the valve, being engageable with a valve seat, the closure member being firmly connected to a damping piston having a displacement space communicating through a throttle opening with a space traversible by the liquid, the throttle opening being so disposed that part thereof is uncovered at least near the closed position of the closure member.

2. Description of the Prior Art

Such a check valve is described in German Published Prosecuted Application DE-AS 1 806 748 wherein a part lying on a valve seat, in closed condition of the valve, is connected to a rod which is mounted so as to be longitudinally displaceable in a blind bore. This blind bore is connected through a throttle opening with a space wherein the liquid of the liquid line flows. What is achieved thereby is that when the valve is opened, the opening displacement is initially uniform and then becomes progressively damped. Further measures are provided therein for also achieving damping in closing direction of the check valve. When this heretofore known valve is closed, a ring piston initially strikes the valve seat without damping. The remaining parts of the closure member are supported on or braced by the ring piston until the closing operation is completed.

It is an object of the invention of the instant application to provide a check valve with damping device that is able to be constructed considerably simpler and consequently made more rugged than the aforementioned heretofore known device of this general type, yet nevertheless, the closing displacement of the check valve member is progressively damped.

With the foregoing and other objects in view, there is provided in accordance with the invention, a check valve with damping device for liquid lines having a closure member mounted for axial displacement and, in closed condition of the valve, being engageable with a valve seat, the closure member being firmly connected to a damping piston having a displacement space communicating through a throttle opening with a space traversible by the liquid, the throttle opening being so disposed that part thereof is uncovered at least near the closed position of the closure member, comprising a hollow cylindrical guide member defining the space traversible by the liquid, the guide member being annularly surrounded by the damping piston and having an adjoining cover forming the closure member, the cover being in engagement with the valve seat in closed condition of the valve, the throttle opening being in the form of passageway openings for the liquid formed in the hollow cylindrical guide member in vicinity of the cover, the damping piston having end faces, and hollow cylindrical chambers defining the displacement space and respectively adjoining the end faces and communicating through the passageway openings with the space defined by the hollow cylindrical guide member.

Other features which are considered as characteristic for the invention, are set forth in the appended claim.

Although the invention is illustrated and described herein as embodied in check valve with damping device, it is nevertheless not intended to be limited to the details shown, since various modifications and structural changes may be made therein without departing from the spirit of the invention and within the scope and range of equivalents of the claim.

BRIEF DESCRIPTION OF THE DRAWING

The construction and method of operation of the invention, however, together with additional objects and advantages thereof will be best understood from the following description of specific embodiments when read in connection with the accompanying single FIGURE of the drawing which is a longitudinal sectional view of a check valve with a damping device constructed in accordance with the invention.

DESCRIPTION OF THE PREFERRED EMBODIMENT

Referring now to the drawing, there is shown therein a check valve according to the invention having a housing 1 with open ends 2 and 3 which adjoin a non-illustrated liquid line, a hollow cylindrical guide member 4 being supported for axial displacement within the housing 1. The hollow cylindrical guide member 4 has a cover 5 firmly connected thereto and is formed with passageway openings 6 for the liquid that are located directly adjacent the cover 5. The latter projects radially outwardly beyond the hollow cylindrical guide member 4 and carries, on the projecting part thereof, a circular ring-shaped seal 7 which engages a valve seat 8 when the check valve is closed. Furthermore, the hollow cylindrical guide member 4 is surrounded by a ring-shaped damping piston 9 having end faces 10 and 11 adjoining respective hollow cylindrical chambers 12 and 13. These hollow cylindrical chambers 12 and 13 are closed off from the inner space of the hollow cylindrical guide member 4 by the casing wall of the hollow cylindrical guide member 4. Throttle openings 14 and 15 are formed in the casing wall of the hollow cylindrical guide member 4, the location of which is selected so that, depending upon the position of the axially displaceable hollow cylindrical guide member 4, a greater or lesser cross-sectional part of the throttle openings 14 and 15 will be covered by the housing 1 or, rather, by a housing insert 16 disposed in the housing 1. The size of the flow-through cross section between the hollow cylindrical chambers 12 and 13 and the interior space of the hollow cylindrical guide member 4 may be matched or accommodated to the required conditions by suitably selecting the number, location and shape of the throttle openings 14 and 15. The direction of travel of the liquid flow is indicated by an arrow 17. Through this flow, the cover 5 with the hollow cylindrical guide member 4 is lifted, as viewed in the FIGURE, against its own weight so that the seal 7 is not in engagement with the valve seat 8, and the passageway openings 6 for the liquid are cleared or freed.

If the direction of liquid flow reverses, for example, due to a break in the non-illustrated liquid pipeline adjoining the open end 2, the hollow cylindrical guide member 4 is thus forced downwardly due to action of gravity and due to the flow resistance of the cover 5. The cleared or exposed cross section, initially quite large, between the hollow cylindrical chamber 13 and the interior space of the hollow cylindrical member 4 permits a rapid displacement of the cover 5 in closing direction i.e. downwardly, as viewed in the FIGURE. Liquid thereby flows from the hollow cylindrical chamber 13 through the throttle openings 15 into the interior space of the hollow cylindrical guide member 4 and from there out through the throttle openings 14 into the hollow cylindrical chamber 12. With increasing displacement of the hollow cylindrical guide member 4, the free flow-through cross section of the throttle openings 15 decreases in size so that damping of the displacement increases.

By means of the foregoing construction, a check valve is produced, in accordance with the invention, which requires only a single movable part and performs a progressively damped displacement. Short closing time periods for the check valve during limited pressure waves produced in the liquid line are able to be attained therewith.

I claim:

1. A check valve assembly having a damping device for liquid lines, comprising a valve body having a flow passage therethrough and a hollow cylindrical chamber surrounding said flow passage, a valve seat in said flow passage, an axially movably supported closure member being movable between an open position of the check valve and a closed position of the check valve in which said closure member lies on said valve seat, a hollow cylindrical guide member conneced to said closure member having a shell defining an inner space through which fluid flows in the open position of the closure member, and a damping piston having two sides and being disposed on the outer periphery of said guide member, said damping piston being firmly connected to said guide member and axially movably guidable in said hollow cylindrical chamber as said closure member moves between the open and closed positions, and said shell having throttle openings formed therein at both of said sides of said damping piston for connecting said hollow cylindrical chamber with said inner space, said throttle openings being positioned and dimensioned such that openings positioned on one side of said damping piston can progressively restrict flow as said closure member moves toward the open position and such that openings on the other side of said damping piston can progressively restrict flow as said closure member moves toward the closed position.

* * * * *